June 1, 1965  G. K. GRACE  3,186,035
APPARATUS FOR THE CONTINUOUS CASTING
OF SOLID PROPELLANT ROCKET MOTORS
Filed Aug. 19, 1963  4 Sheets-Sheet 1

Garland K. Grace
INVENTOR.

BY
Attorney

Garland K. Grace
INVENTOR.

United States Patent Office 3,186,035
Patented June 1, 1965

3,186,035
APPARATUS FOR THE CONTINUOUS CASTING OF SOLID PROPELLANT ROCKET MOTORS
Garland K. Grace, Huntsville, Ala., assignor to Thiokol Chemical Corporation, Bristol, Pa., a corporation of Delaware
Filed Aug. 19, 1963, Ser. No. 302,819
4 Claims. (Cl. 18—26)

This invention relates to an improved apparatus for the continuous casting of solid propellant rocket motors and, more particularly, to a system wherein programmed core withdrawal is achieved.

In the casting of uncured propellant in a motor case for a solid propellant rocket motor, it is always necessary to form a central configuration in the uncured propellant, which configuration will be retained during the curing process.

With the size of the solid propellant rocket motors increasing as new requirements therefor are determined, the core means for forming the central configuration will also increase in size; and the removal of such core means from the solid propellant after it has been cured will become a very critical problem.

The adhesion of the solid propellant to the core means creates an additional force that must be overcome in the removal of the core means; and such force, in many instances, is greater than the force that is required to remove the core means from the motor case. Thus as the size of the solid propellant rocket motor increases, the size of the core means will also increase and the removal force for the core means plus the force created by the adhesion of the solid propellant will increase to such an extent that the present method of removing the core means will be inadequate.

It is an object of the present invention, therefore, to produce an apparatus which includes a short core means that may be slowly withdrawn as the uncured solid propellant is cast into the motor case for the solid propellant rocket motor.

Another object of the invention is to provide a barrier between the core means and the uncured solid propellant that prevents the adhesion of the uncured solid propellant to the core means during the removal of the core means from the uncured solid propellant and during the casting thereof.

The requirements of the size of the core means will be determined by the size of the solid propellant rocket motor and the cure rate of the uncured solid propellant.

The barrier between the core means and the uncured solid propellant can be made of any well-known reinforced plastic or rubber that possesses mold-releasing properties. A well-known mold-releasing lubricant can be applied to the core means so that there will be no friction between the core means and the barrier that is used between the core means and the solid propellant.

The apparatus must also include components that will maintain perfect alignment between the core means and the motor case during the removal of the core means from the motor case.

It is a further object of the invention, therefore, to provide an apparatus that includes means for withdrawing the core means as well as means for maintaining a perfect alignment between the core means and the motor case during the removal of the core means from the motor case as the uncured solid propellant is cast therein.

With the above and other objects and advantages in view, the invention consists of the novel details of construction, arrangement, and combination of parts more fully hereinafter described, claimed, and illustrated in the accompanying drawings in which:

Figure 1:
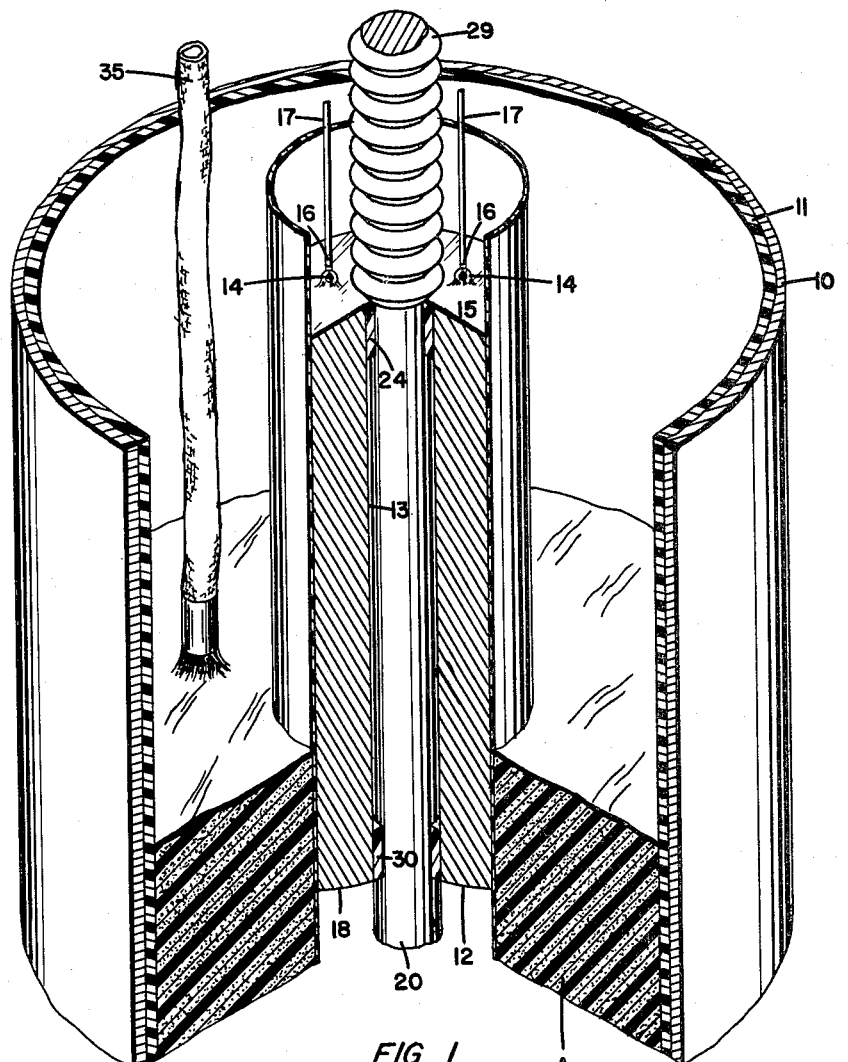
FIGURE 1 is a fragmentary sectional perspective view, partly broken away, of the apparatus embodying the invention as positioned in a motor case for a solid propellant rocket motor.

Referring more in detail to the drawings wherein like parts are designated by like reference numerals, the reference numeral 10 is used to designate a portion of a motor case for a solid propellant rocket motor. Applied to the interior surface of the motor case 10 is an elastomeric lining 11. The motor case 10 and lining 11 form no part of the instant invention and are used only for the illustration of the use of the apparatus embodying the invention when used in the casting of an uncured propellant A into the motor case 10 in contact with the lining 11.

The apparatus embodying the invention comprises a solid circular core means 12 that is provided with a centrally-located, longitudinally-extending bore 13 and a plurality of lifting eyes 14 on the aft end 15 thereof that are engaged by lifting hooks 16 connected to hoist cables 17, there being a hoist cable 17 for each lifter eye 14 on the core means 12. The head end 18 of the core means 12 is contoured to conform to the configuration of the liner 11 as it also conforms to the head end 19 of the motor case 10.

Figure 2:
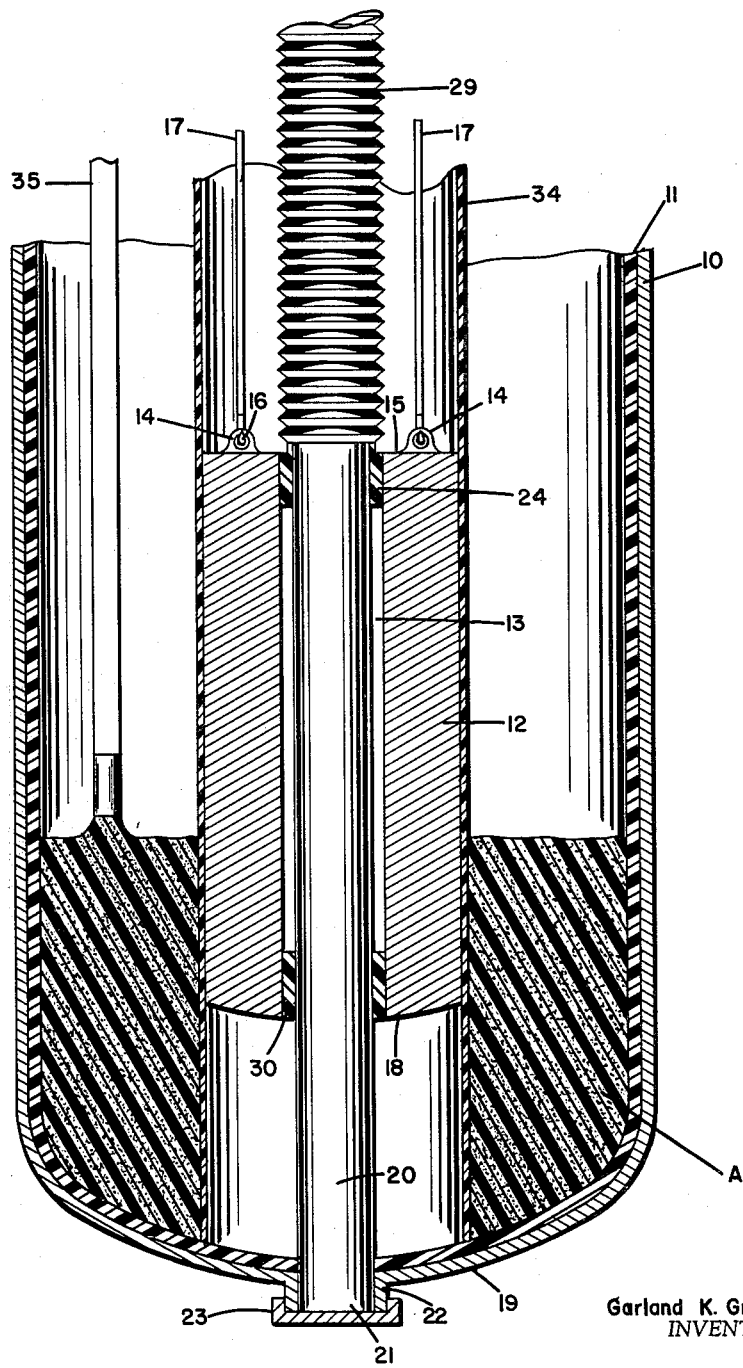
FIGURE 2 is a vertical sectional view, with parts broken away, of the apparatus and motor case of FIGURE 1.
Figure 3:
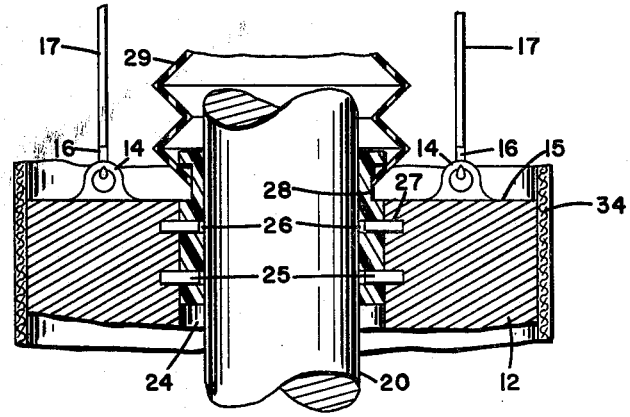
FIGURE 3 is a fragmentary detailed sectional view of the upper portion of the core means.
Figure 4:
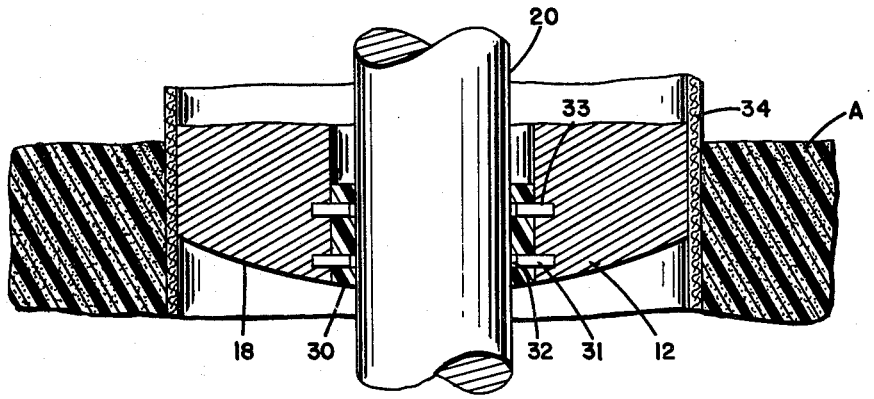
FIGURE 4 is a view similar to FIGURE 3 of the lower portion of the core means and also showing a portion of the solid propellant that is being cast in the motor case.

A centering or guide rod 20 extends for the entire length of the motor case 10 and the head end 21 thereof extends through a flanged igniter opening 22 in the head end 19 of the motor case 10 to rest on a cap 23 that is fitted to the flanged opening 22 with an airtight seal, as shown in FIGURE 2.

An upper bushing 24 of any suitable plastic material such as Teflon or the like is secured within the bore 13 adjacent to the aft end 15 of the core means 12 by a plurality of pins 25. The pins 25 extend through a plurality of transversely-extending, radially-spaced, parallel openings 26 in the bushing 24 to be seated in a plurality of aligned sockets 27 in the core means 12 and thus retain the bushing 24 in fixed relation to the core means 12.

The bushing 24 extends outwardly of the aft end 15 of the core means 12 and is provided with an annular recess 28 into which is snapped the head end of an elastic bellows-protecting sleeve 29 which extends from the core means 12 to a point outwardly of the motor case 10. The sleeve 29 protects the guide rod 20 from contamination as would be caused by contact with the solid propellant A or any air-carried debris or the like.

There is also secured to the head end 18 of the core means 12 a bushing 30; and this bushing is made of the same material as bushing 24. A plurality of pins 31 extending through a plurality of transverse openings 32 in the bushing 30 to be seated in aligned sockets 33 in the head end 18 of the core means 12 serve to retain the bushing 30 within the bore 13 in fixed relation to the core means 12. The bushings 24 and 30 slidably engage the rod 20 and provide free movement of the core means 12 on the rod 20.

In the use of the apparatus embodying the invention, a flexible barrier sleeve 34 made of a plastic material having mold-releasing properties, such as Teflon or the like, is positioned over the rod 20 and core means 12 in circumjacent relation thereto before the core means 12 and the rod 20 are lowered into the motor case 10. A suitable lubricant is applied to the exterior of the core means 12 before the sleeve 34 is applied thereto so that the removal of the core means 12 is facilitated during the casting of the uncured propellant A.

When the core means 12, rod 20, and barrier sleeve 34 are in position, the uncured propellant A is cast into the motor case 10 by means of a casting bayonet 35. As the level of the uncured propellant A reaches the head end 15 of the core means 12, the core means 12 is slowly withdrawn from the motor case 10 by means of the hoisting cables 17. The rapidity of the movement of the core means 12 depending upon the curing period of a properly formulated propellant. The barrier sleeve 34 remains in contact with the uncured propellant so that the surface of the propellant is not damaged as the core means 12 is removed. The barrier sleeve 34 also prevents displacement of the propellant if it is not fully cured as the core means 12 is withdrawn.

Figure 5:
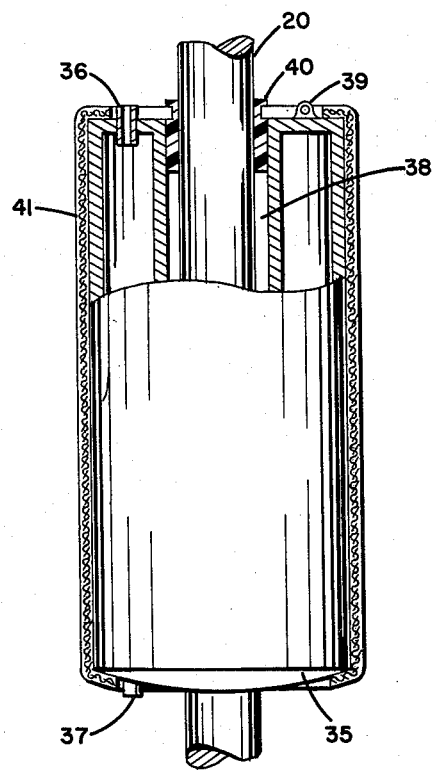
FIGURE 5 is an elevational view, partly in section and partly broken away, of a modified form of core means that may be substituted for the core means shown in FIGURES 1 to 4 inclusive.

In the event it is desired to speed up the cure of the propellant A adjacent the core means, a core means 35 such as shown in FIGURE 5 may be substituted for the core means 12. Unlike the core means 12 which, as shown is solid, the core means 35 is hollow so that a heating medium may be introduced therein by means of an inlet valve 36 that is located in the aft end thereof. To drain the heating medium from the core means 35, an outlet or drain valve 37 is located in the head end of the core means 35.

The core means 35, like the core means 12, is provided with a centrally-located, longitudinally-extending bore 38 and a plurality of lifting eyes 39 are provided on the aft end thereof for engagement with the lifting hooks 16 on the hoist cables 17. The guide rod 20 will extend through the bore 38 of the core means 35 and a bushing 40 similar to the bushing 24 is positioned within the bore 38 adjacent to the aft end of the core means 35. Another bushing similar to the bushing 30 will also be positioned within the bore 38 adjacent to the head end of the core means 35.

In this instance, an elastic flexible barrier sleeve 41 will be placed on the outer surface of the core means 35 and will move as a unit with the core means 35. Thus with sleeve 41 having the mold-releasing properties as previously described, the core means 35 can be easily removed. With the heating medium in the core means 35, the propellant A adjacent thereto will cure more quickly; and it will not be necessary for the barrier sleeve 41 to remain in contact with the propellant A as with the use of the core means 12.

In illustrating the invention, the core means 12 and 35 have been illustrated as being of circular formation; but it is to be understood that the core means may be of any desired cross-section and the size thereof is to be varied as the size of the motor case 10 is varied.

The use of a core means such as previously described and a properly formulated propellant will permit the casting of very large solid propellant rocket motors with a relatively short core means that will eliminate many problems that would arise in removing large cores of conventional configurations.

It is believed that from the foregoing description the method and manner of use of the apparatus in casting solid propellant rocket motors will be clear to those skilled in the art, and it is to be understood that changes in the details of construction, arrangement, and combination of parts of the apparatus may be resorted to provided such changes fall within the spirit of the invention and the scope of the appended claims.

Having thus described the invention, what is claimed as new and desired to be secured by Letters Patent is:

1. An apparatus for use in casting an uncured propellant in the motor case of a solid propellant rocket motor comprising a guide means extending longitudinally of the motor case, a core means slidably mounted on said guide means, hoisting means connected to said core means for withdrawing said core means from the motor case and a flexible plastic barrier surrounding said guide means and said core means to prevent contact thereof with the uncured propellant being cast into the motor case.

2. The apparatus, as in claim 1, wherein a bellows-shaped protective sleeve is positioned on said guide means outwardly of said core means and said sleeve is connected at the head end thereof to said core means.

3. The apparatus, as in claim 2, wherein said core means is provided with a longitudinally-extending bore to receive said guide means, bushings are secured within said bore adjacent the opposite ends of said core means and the head end of said sleeve is connected to one of said bushings.

4. The apparatus, as in claim 3, wherein said core means is of hollow formation and means is provided for introducing a heating medium into said core means.

References Cited by the Examiner

UNITED STATES PATENTS

| | | |
|---|---|---|
| 965,150 | 8/10 | Atterbury. |
| 1,171,579 | 2/16 | Atterbury. |
| 1,236,556 | 8/17 | Goldsborough _____ 25—118 |
| 2,414,466 | 1/47 | Hummel _____ 18—26 |
| 2,774,989 | 12/56 | Crammond et al. _____ 18—26 |
| 2,877,504 | 3/59 | Fox _____ 264—3 |
| 2,916,776 | 12/59 | O'Neill et al. _____ 264—3 |
| 3,069,744 | 12/62 | Emery _____ 25—128.1 |

CARL D. QUARFORTH, *Primary Examiner.*

L. DEWAYNE RUTLEDGE, *Examiner.*